United States Patent

Dolan

[15] 3,678,584
[45] July 25, 1972

[54] MEASURING PROBE ASSEMBLY

[72] Inventor: Richard F. Dolan, Mount Clemens, Mich.
[73] Assignee: General Motors Corporation, Detroit, Mich.
[22] Filed: Aug. 13, 1970
[21] Appl. No.: 63,566

[52] U.S. Cl............................................33/169 R, 33/174 J
[51] Int. Cl........................................G01b 5/00, G01b 3/00
[58] Field of Search...............33/169 R, 169 C, 174 J, 174 L, 33/23 K, 172, 170, 21

[56] References Cited

UNITED STATES PATENTS

| 3,478,436 | 11/1969 | Barnes | 33/170 |
| 2,571,853 | 10/1951 | Fontecchio | 33/172 B X |
| 3,217,418 | 11/1965 | Wennerberg | 33/172 R |

*Primary Examiner*—Harry N. Haroian
*Attorney*—W. E. Finken and Herbert Furman

[57] ABSTRACT

A measuring probe assembly includes a hollow annular housing adapted to be mounted on a carrier of a coordinate measuring instrument. One end of a shaft is received within the housing and ball bearing assemblies mount the shaft for rotational movement with respect to the housing about a first axis. A drag member is keyed to the housing adjacent one end thereof and includes spaced leg portions that adjustably frictionally engage the other end of the shaft, which extends outwardly of the housing, and thus vary the freedom of rotation of the shaft about the first axis. A first arm has one end secured to the other end of the shaft for rotational movement therewith about the first axis. The other end of the first arm supports a second arm, adjacent one end thereof, for rotational movement about a second axis which intersects the first axis at an angle of 45°. A thumb screw adjustably varies the frictional drag between the first and second arms to vary the freedom of rotation of the second arm about the second axis. The other end of the second arm supports a null indicator which includes a probe slidably mounted with respect to the second arm along a third axis that intersects the first and second axes at the intersection thereof at an angle of 45° with respect to the second axis. With the probe in the null position, the tip of the probe is coincident with the intersection of the axes and rotation of the first and second arms to orient the probe in different positions constantly maintains the tip of the probe at the intersection thus constantly fixed with respect to the housing.

3 Claims, 4 Drawing Figures

PATENTED JUL 25 1972

3,678,584

INVENTOR.
Richard F. Dolan
BY
Herbert Furman
ATTORNEY

MEASURING PROBE ASSEMBLY

This invention relates to measuring probe assemblies and more particularly to a measuring probe assembly in which the probe can be oriented in various positions while maintaining the tip of the probe in a constant position with respect to the carrier of a coordinate measuring instrument supporting the probe assembly.

It is conventional to mount a measuring probe assembly on a three-way movable carrier of a coordinate measuring instrument that reads the position of the probe assembly with respect to coordinate axes as the probe assembly reads specified locations on various articles of manufacture and prototypes thereof. The probe assembly thus makes it possible to determine whether the coordinate positions of the specified locations are according to specification. In the manufacture of vehicles, such a probe assembly is used to read the coordinate positions of specified locations on clay prototypes prior to the construction of permanent wood, metal, or fiber glass prototypes. Due to the designs of certain vehicles and the corresponding configurations of the clay prototypes, it is sometimes quite difficult to measure the coordinate positions of the prototypes with the probe assembly constantly maintaining the probe in a fixed orientation with respect to the carrier of the coordinate measuring instrument. Also, due to the fact that the clay which is used to form the prototypes is quite soft, it is desirable that the probe be oriented perpendicular to the surface of the specified location being read such that accurate readings can be taken with a minimum of deformation in the clay. Nevertheless, it is also desirable that the tip of the probe be maintained in a fixed position with respect to the carrier of the coordinate measuring instrument such that the positions of the carrier and the probe assembly accurately reflect the coordinate positions of the specified locations that are read without the necessity of applying a correction factor to the readings to reflect movement of the tip of the probe with respect to the carrier.

This invention provides a probe assembly in which the probe can be oriented perpendicular to the surfaces of the specified locations on the article of manufacture or prototype while maintaining the tip of the probe in a fixed position with respect to the carrier of the coordinate measuring instrument that supports the probe assembly.

An object of this invention is to provide a probe assembly in which the probe can be oriented perpendicular to various surfaces while maintaining the tip of the probe in a fixed position with respect to the carrier of the coordinate measuring instrument supporting the probe assembly.

Another object of this invention is to provide a probe assembly in which the probe can be oriented perpendicular to any surface of a hemisphere while maintaining the tip of the probe in a fixed position with respect to the carrier of the coordinate measuring instrument supporting the probe assembly.

In carrying out these objects, the probe assembly includes arms which are connected in series for rotational movement about axes that intersect at a common apex point. The last arm of the series supports a probe whose tip is coincident with the apex point such that movement of the arms, to orient the probe in various positions, maintains the tip of the probe in a fixed position with respect to the carrier of the coordinate measuring instrument.

In the preferred embodiment, two arms are used and the axis between the arms is at an angle of 45° to the axis of rotation of the first arm with respect to the assembly housing. Likewise, the axis of the probe mounted on the second arm is at an angle of 45° to the axis between the arms. Also, adjustable drag members between the housing and first arm and between the arms vary the freedom of rotation of the arms.

Figure 1:
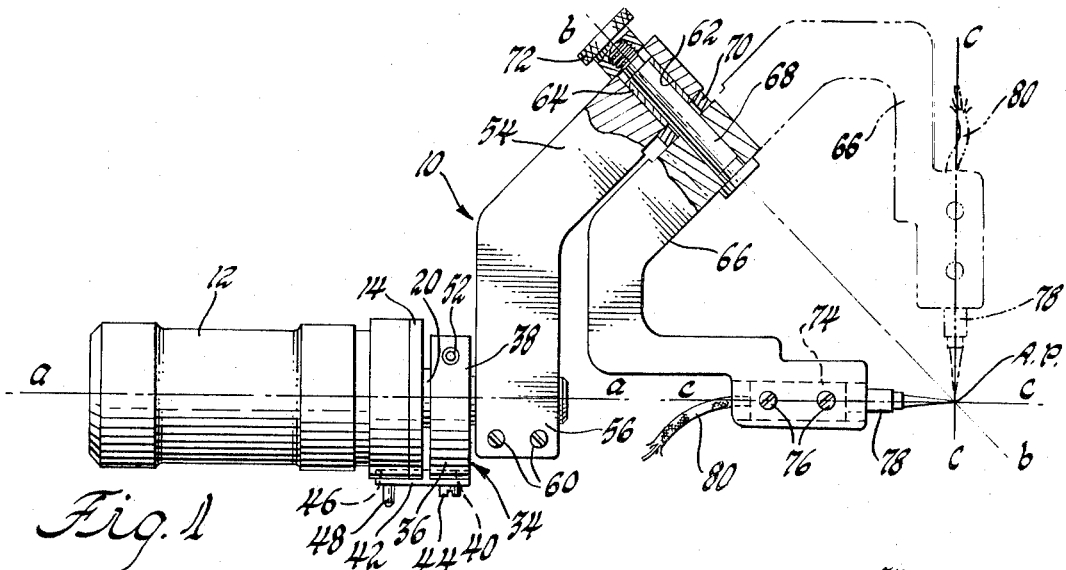
FIG. 1 is a view of the probe assembly with the axis of the probe aligned with the axis of rotation of the first arm in the solid line indicated position and with the axis of the probe perpendicular to the axis of rotation of the first arm in the phantom line indicated position.

Referring to FIG. 1, a measuring probe assembly, generally indicated at 10, includes a hollow annular housing 12 which is adapted to be supported by a carrier of a coordinate measuring instrument. In cooperation with the reading of the probe assembly 10 at the specified locations on the article of manufacture or prototype, as will be later described, the measuring instrument reads the positions of the specified locations with respect to coordinate axes to determine whether the article of manufacture or prototype is according to specification.

Figure 2:
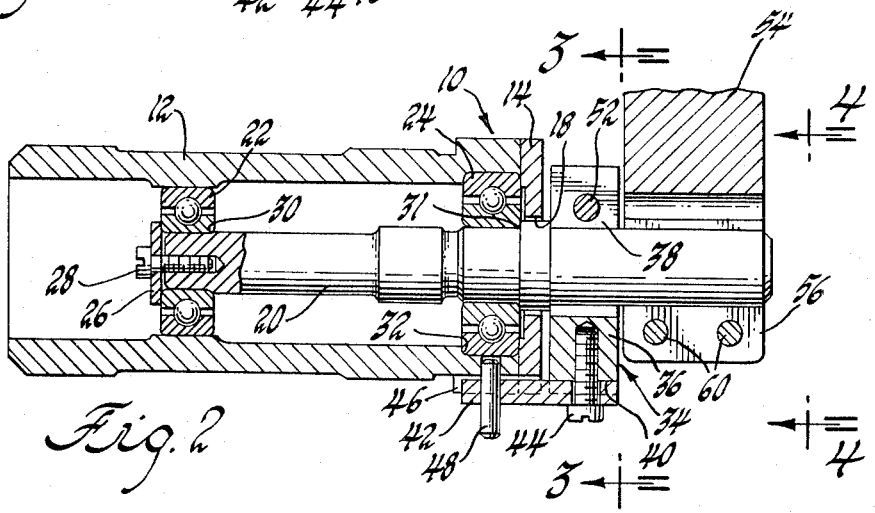
FIG. 2 is an enlarged sectional view of a portion of FIG. 1.
Figure 3:
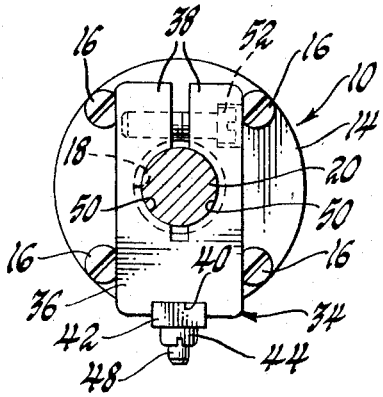
FIG. 3 is a view taken along line 3—3 of FIG. 2.
Figure 4:
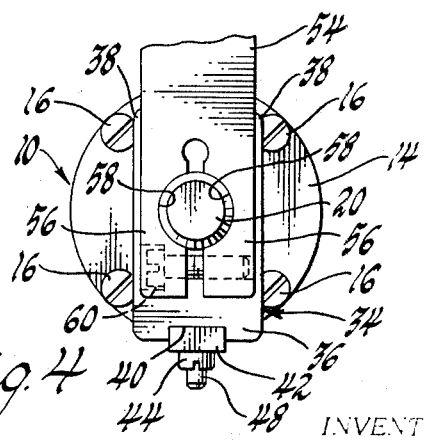
FIG. 4 is a view taken along line 4—4 of FIG. 2.

Referring additionally now to FIGS. 2 through 4, housing 12 is closed at one end by an end plate 14 which is secured in position by screws 16. End plate 14 includes a central aperture 18 that receives a shaft 20. One end of shaft 20 is also received within housing 12 and ball bearing assemblies 22 and 24 mount shaft 20 for rotational movement with respect to housing 12 about axis $a$—$a$ as in FIG. 1. A washer 26 is secured to shaft 20 by a screw 28 and the periphery of washer 26 engages the inner ring of bearing assembly 22. Annular flanges 30 and 31 on shaft 20, annular flange 32 on housing 12, and end plate 14 thus cooperate with washer 26 to axially position shaft 20 with respect to housing 12.

A frictional drag member 34 includes a base portion 36 with spaced leg portions 38 extending therefrom. The base portion 36 includes a key slot 40 which receives a key 42 secured to member 34 by a screw 44. Key 42 is also received within a key slot 46 in housing 12 and a press fitted pin 48 secures the key 42 to housing 12 to thus prevent movement of member 34 with respect to housing 12. The leg portions 38 include respective arcuate slots 50 that open toward each other in concentric relationship and receive the other end of shaft 20 that extends outwardly of housing 12 through aperture 18 in end plate 14. Adjustment of a screw 52 that extends between the outer ends of leg portions 38 varies the frictional engagement between the shaft 20 and the leg portions 38. Loosening of screw 52 causes leg portions 38 to move away from each other such that shaft 20 is freely rotatable within housing 12; conversely, tightening of screw 52 causes leg portions 38 to move toward each other to prevent any relative rotation of shaft 20 with respect to housing 12. It is also possible to provide any degree of freedom of rotation between the two limits such that the shaft will assume any angular position and remain thereat until a predetermined torque is applied thereto.

A first arm 54 includes leg portions 56 adjacent one end thereof as best seen in FIG. 4. The leg portions 56 include respective arcuate slots 58 that open toward each other in concentric relationship and receive the other end of shaft 20. Screws 60 extend between leg portions 56 to secure the first arm 54 to shaft 20 against relative movement with respect thereto. The first arm 54 is thus supported for rotational movement about axis $a$—$a$.

The other end of the first arm 54 includes an aperture 62 that receives a bearing insert 64. One end of a second arm 66 mounts a pin 68 which is received within bearing insert 64 and supports the second arm 66 for rotational movement about an axis $b$—$b$, FIG. 1. Axis $b$—$b$ intersects axis $a$—$a$ at an angle of 45° at apex point A.P. A spacer 70 in cooperation with an adjustable thumb screw 72 on the threaded end of pin 68 varies the freedom of rotation of the second arm 66 with respect to the first arm 54.

As seen in FIG. 1, the other end of the second arm 66 supports a dash line indicated null indicator 74 which is secured thereto by screws 76. Null indicator 74 is of the commercially available type and supports a probe 78 for sliding movement, by way of an air bearing, along an axis $c$—$c$ which is oriented at 45° with respect to axis $b$—$b$ and intersects axes $a$—$a$ and $b$—$b$ at apex point A.P. A conduit 80 supplies air pressure to the air bearing within null indicator 74 and biases the probe 78 to a null position in which the tip of probe 78 is coincident with apex point A.P. and as such with axes $a$—$a$, $b$—$b$, and $c$—$c$. Conduit 80 also carries wires which are adapted to be connected to a null meter to visually display whether or not probe 78 is in the null position.

When housing 12 of probe assembly 10 is mounted on the carrier of a coordinate measuring instrument, the first arm 54 can thus be rotated with respect to the carrier about axis $a-a$ without changing the position of the tip of probe 78 with respect to the carrier. Likewise, the second arm 66 can be rotated about axis $b-b$ without changing the position of the tip of probe 78 with respect to the carrier. The probe 78 can thus be oriented perpendicular to any surface of a hemisphere which is convex with respect to housing 12 and whose great circle lies in a plane perpendicular to axis $a-a$.

To read the coordinate position of a specified location on an article of manufacture or prototype, arms 54 and 66 are rotated until the axis of probe 78 is perpendicular to the surface of the specified location. The carrier of the measuring instrument is then moved until probe 78 contacts the surface and reaches the null position whereupon the coordinate position of the specified location is recorded. To take a second reading, arms 54 and 66 are rotated about their respective axes, to orient probe 78 perpendicular to any surface of the aforementioned hemisphere, while maintaining the tip of probe 78 in the same position with respect to the carrier. The second reading, and any subsequent reading, will thus accurately reflect the coordinate positions of the specified locations without applying a correction factor due to the different orientations of the probe axis.

The invention thus provides a probe assembly that orients the probe perpendicular to various surfaces while maintaining the tip of the probe in a fixed position with respect to the carrier of the measuring instrument.

What is claimed is:

1. A measuring probe assembly comprising, a first arm, means adapted to mount the first arm on a carrier of a coordinate measuring instrument for rotational movement with respect thereto about a first axis, a second arm mounted on the first arm for rotational movement with respect thereto about a second axis intersecting the first axis at an angle of 45°, and a probe mounted on the second arm with the longitudinal axis of the probe being oriented at an angle of 45° with respect to the second axis and intersecting the first and second axes at the intersection thereof, the tip of the probe being coincident with the intersection of the axes.

2. A measuring probe assembly comprising, a housing adapted to be mounted on a carrier of a coordinate measuring instrument, a shaft mounted on the housing for rotational movement with respect thereto about a first axis, a first arm mounted on the shaft and fixed with respect thereto, a second arm mounted on the first arm for rotational movement with respect thereto about a second axis intersecting the first axis at an angle of 45°, and a null indicator mounted on the second arm and having a probe slidable with respect thereto along a third axis, the third axis being oriented at an angle of 45° with respect to the second axis and intersecting the first and second axes at the intersection thereof, the tip of the probe being coincident with the intersection of the axes with the probe in the null position.

3. A measuring probe assembly comprising, a housing adapted to be mounted on a carrier of a coordinate measuring instrument, a shaft mounted on the housing for rotational movement with respect thereto about a first axis, first means between the housing and the shaft for adjustably limiting rotation of the shaft with respect to the housing, a first arm mounted on the shaft and fixed with respect thereto, a second arm mounted on the first arm for rotational movement with respect thereto about a second axis intersecting the first axis at an angle of 45°, second means between the first and second arms for adjustably limiting the rotation of the second arm with respect to the first arm, and a null indicator mounted on the second arm and having a probe slidable with respect thereto along a third axis, the third axis being oriented at an angle of 45° with respect to the second axis and intersecting the first and second axes at the intersection thereof, the tip of the probe being coincident with the intersection of the axes with the probe in the null position.

* * * * *